(12) United States Patent
Wu

(10) Patent No.: US 8,182,684 B1
(45) Date of Patent: May 22, 2012

(54) HYDROCYCLONE SEPARATOR

(75) Inventor: Rome-Ming Wu, New Taipei (TW)

(73) Assignee: Tamkang University Department of Chemical and Materials Engineering, Tamsui Dist., New Taipei (TW)

( * ) Notice: Subject to any disclaimer, the term of this patent is extended or adjusted under 35 U.S.C. 154(b) by 0 days.

(21) Appl. No.: 13/340,359

(22) Filed: Dec. 29, 2011

(30) Foreign Application Priority Data

Mar. 28, 2011 (TW) .................................. 100205453

(51) Int. Cl.
  *B01D 17/038* (2006.01)
  *B01D 21/26* (2006.01)
  *B01D 36/00* (2006.01)
(52) U.S. Cl. ...................... 210/304; 210/512.1; 210/788; 210/806; 209/12.1; 209/732; 209/733
(58) Field of Classification Search .................. 210/304, 210/512.1, 788, 806; 209/12.1, 732, 733
  See application file for complete search history.

(56) References Cited

U.S. PATENT DOCUMENTS 5,478,484 A * 12/1995 Michaluk ...................... 210/304

* cited by examiner

*Primary Examiner* — David A Reifsnyder
(74) *Attorney, Agent, or Firm* — Shimokaji & Associates, P.C.

(57) ABSTRACT

A hydrocyclone separator includes a separator body having an upper body part and a lower body part narrower than the upper body part in diameter; a feeder connected helically to the upper body part from a lateral side for feeding in a raw liquid; an upstream outlet disposed axially within the separator body, having an upper part projecting upward and axially from the upper body part and a lower part extending into the lower body part; a downstream outlet attached axially to the lower body part in spatially communication therewith; and a filtering unit disposed axially within an inner wall confining the upstream outlet. The filtering unit has an upper part projecting upwardly and outwardly from a top end of the upstream outlet and a lower part extending into the downstream outlet. The filtering unit consists of a filtering membrane having an inner wall confining the filtering member.

5 Claims, 3 Drawing Sheets

HYDROCYCLONE SEPARATOR

BACKGROUND OF THE INVENTION

1. Field of the Invention

The present invention relates to a hydrocyclone separator, more particularly to a hydrocyclone separator provided with a filtering unit so as to possess the filtering abilities.

2. Description of the Prior Art

Before the 1970 era, the hydrocyclone separators are widely used in the paper pulp industry for processing the water clarification. Presently, the hydrocyclone separators are utilized in the electronic industry in order to recycle the rare metals, in the petrochemical industry for separating oil and water and in the mining exploration industry in order to sieve out the minerals from soil. Since the hydrocyclone separator utilizes combination of mass gravity, subsidence and centrifugal means, it is capable of separating or removing relatively heavy particles from a raw mixed liquid and for separating a molecule layer, a flow division from a light-weight liquid. Hence, the hydrocyclone separator at present serves as the most widely used solid-liquid separator for forming liquid layer and solid or semi-solid layer from the raw mixed liquid.

For those particles needing precise diameter to be employed in the high tech industry, separation of only the underflow and overflow fluid does not meet the required standard, since the overflow fluid separated by the hydrocyclone separator needs to undergo a filtering process in order to achieve the required Clark Degree. In an environment with poor hygienic condition, the water source is required to be separated in order to meet the standards for drinking water or cleansing water. The process presently utilized is relatively expensive or complicated to manipulate.

Therefore, it is highly required to develop a simply operated and low-cost hydrocyclone separator, which is adapted to filter a raw mixed liquid into the required clarified liquid.

SUMMARY OF THE INVENTION

Therefore, the object of the present invention is to provide a hydrocyclone separator that includes a separator body, a feeder, an upstream outlet, a downstream outlet and a filtering unit. The separator body defines a hollow chamber, has an upper body part of a cylindrical shape and a lower body part of a truncated cone shape extending downward and gradually narrow relative the upper body part in diameter. The feeder is connected helically to the upper body part from a lateral side thereof for feeding a raw liquid thereinto. The upstream outlet in the form of a hollow cylinder is disposed axially within the separator body, has an upper part projecting upward and axially from the upper body part and a lower part extending into the lower body part. The downstream outlet is attached axially to a lowermost end of the lower body part and in spatially communication with the lower body part. The filtering unit is disposed axially within an inner wall confining the upstream outlet. Preferably, the filtering membrane is selected from a group consisting of a ceramic membrane, a glass fiber membrane, Polyvinylidene fluoride (PVDF) membrane, a Teflon membrane, an active carbon membrane and a resinous ion exchange membrane.

When a raw mixed fluid is fed into the separator body via the feeder, due to different characteristic of the solid molecules and liquid molecules in the raw mixed fluid, the relatively large particles in the raw mixed fluid will collide against the inner wall of the separator body and flows downstream (known as underflow) due to the centrifugal force caused due feeding operation of the raw mixed fluid. Hence, the large particles are collected via the downstream outlet. Since a vortex flow is caused simultaneously within the inner wall of the upstream outlet, the small particles are pushed axially upward so as to be collected via an exterior pump. In addition, portions of the downstream flow or upstream flow are passed through the filtering unit so as form the clarified liquid such that the clarified liquid is collected at the top or bottom end of the filtering unit with the assistance of an exterior pump.

The feature of the hydrocyclone separator of the present invention resides in that since the filtering unit is implemented within the hydrocyclone separator, once the raw mixed fluid is fed thereinto, the large and small particles and the clarified liquid can be collected simultaneously in addition to that the separator can be easily operated and is low in cost.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENT

Figure 1:
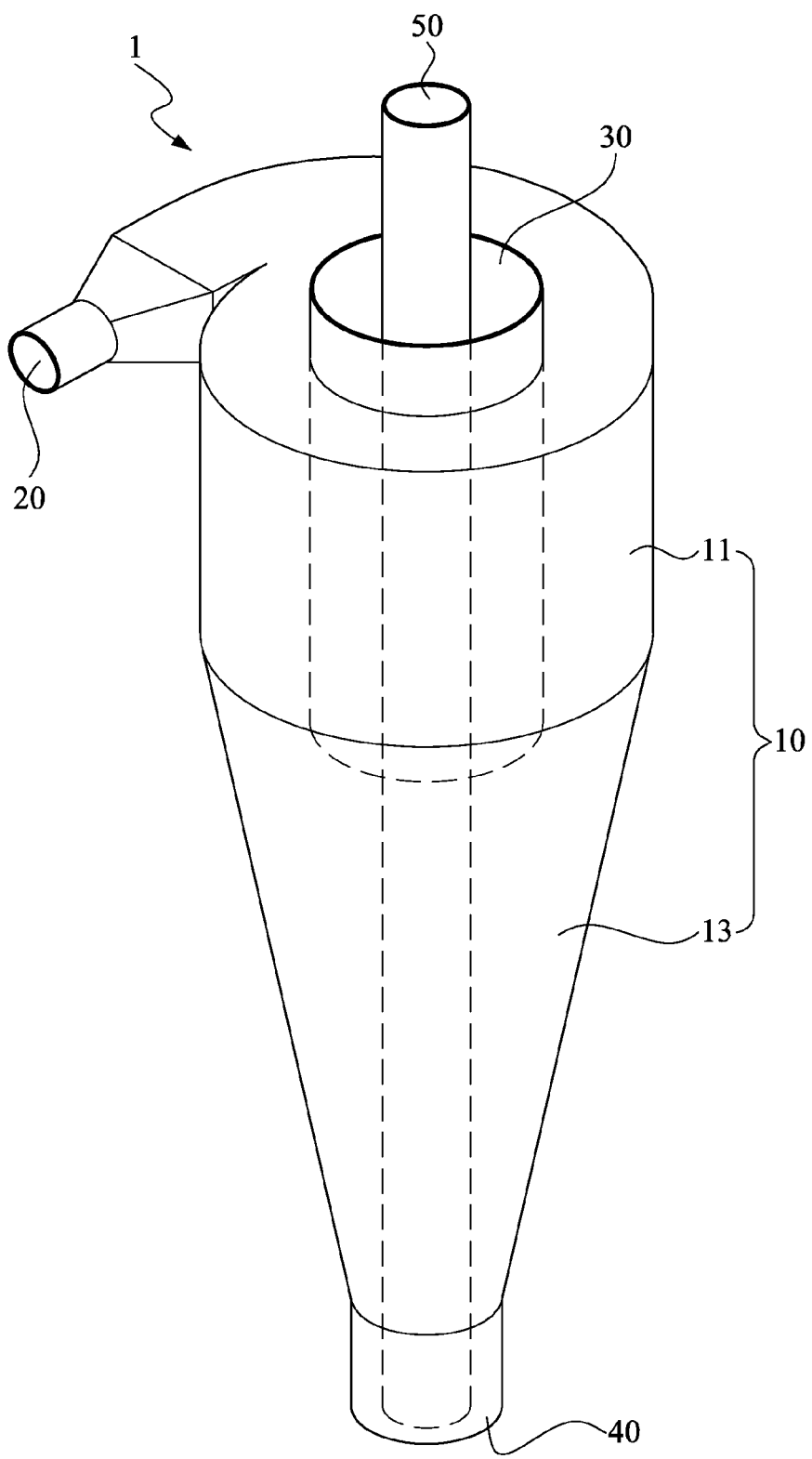
FIG. 1 shows a perspective view of a hydrocyclone separator of the present invention.
Figure 2:
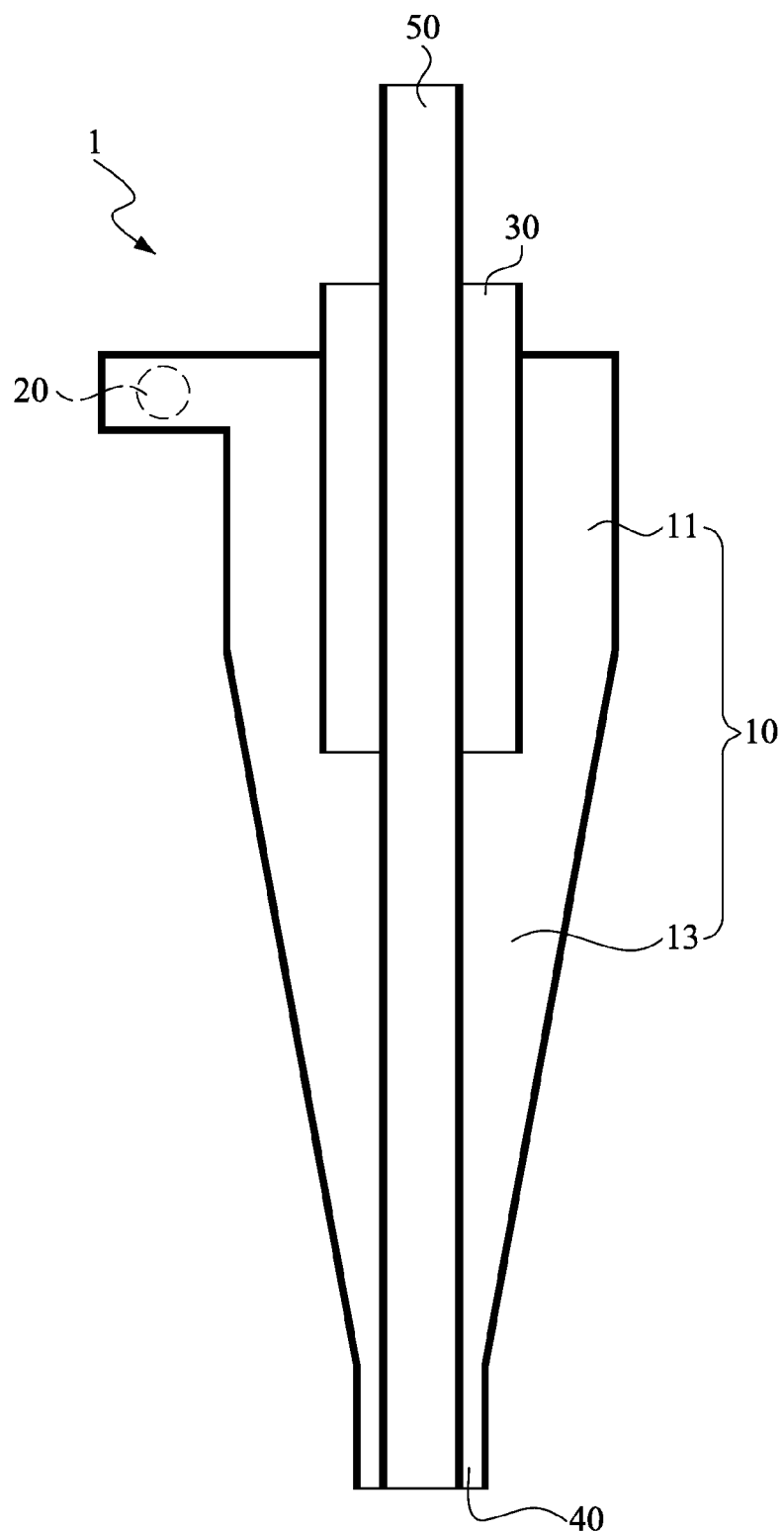
FIG. 2 is a cross-section illustrating the hydrocyclone separator of the present invention.

Referring to FIGS. 1 and 2, wherein FIG. 1 shows a perspective view of a hydrocyclone separator of the present invention while FIG. 2 is a cross-section illustrating the hydrocyclone separator of the present invention. As illustrated, the hydrocyclone separator 1 of the present invention includes a separator body 10, a feeder 20, an upstream outlet 30, a downstream outlet 40 and a filtering unit 50. The separator body 10 defines a hollow chamber, has an upper body part 11 of a cylindrical shape and a lower body part 13 of a truncated cone shape extending downward and gradually narrow relative the upper body part 11 in diameter. The feeder 20 is connected helically to the upper body part 11 from a lateral side thereof for feeding a raw liquid thereinto. The upstream outlet 30 in the form of a hollow cylinder is disposed axially within the separator body 10, has an upper part projecting upward axially and outwardly from the upper body part 11 and a lower part extending into the lower body part 13. The downstream outlet 40 is attached axially to a lowermost end of the lower body part 13 and in spatially communication with the lower body part 13. The filtering unit 50 is disposed axially within an inner wall confining the upstream outlet 30, has an upper part projecting upwardly and outwardly from a top end of the upstream outlet 30 and a lower part extending into the downstream outlet 40. The filtering unit 50 consists of a filtering membrane having an inner wall 55 (see FIG. 3) confining the filtering member.

In this embodiment, the separator body 10, the feeder 20, the upstream outlet 30, the downstream outlet 40 and the filtering unit 50 are integrally formed with one another. In another embodiment, the separator body 10, the feeder 20, the upstream outlet 30, the downstream outlet 40 and the filtering unit 50 are independently fabricated and are later assembled together in order to form the hydrocyclone separator 1 of the present invention.

Figure 3:
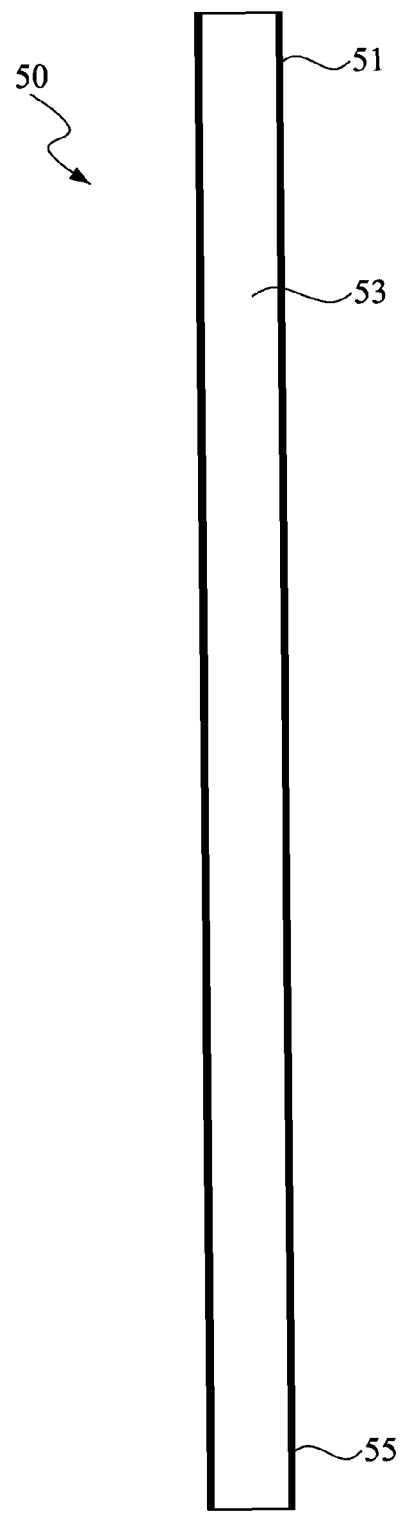
FIG. 3 is a cross-section view of a filtering unit employed in the hydrocyclone separator of the present invention.

FIG. 3 show a cross-section view of the filtering unit employed in the hydrocyclone separator 1 of the present invention. As shown, the filtering unit 50 includes a coupler head 51 defining the upper part projecting upwardly, axially and outwardly from the top end of the upstream outlet 30 for connected spatially to an exterior pipe [not shown] and a filtering tube 53 that is defined by the inner wall 55 of the filtering membrane and that projects downward from the coupler head 51 in such a manner to extend within a bottom end of the downstream outlet 40. Preferably, the filtering membrane 55 is selected from a group consisting of a ceramic membrane, a glass fiber membrane, Polyvinylidene fluoride [PVDF) membrane, a Teflon membrane, an active carbon membrane and a resinous ion exchange membrane.

When a raw mixed fluid is fed into the separator body 10 via the feeder 20, due to different characteristic of the solid molecules and liquid molecules in the raw mixed fluid, the relatively large particles in the raw mixed fluid will collide against the inner wall of the separator body and flows downstream (known as underflow) due to the centrifugal force caused due feeding operation of the raw mixed fluid. Hence, the large particles are collected via the downstream outlet 40. Since a vortex flow is caused simultaneously within the inner wall of the upstream outlet 30, the small particles are pushed axially upward so as to be collected via an exterior pump [not shown]. In addition, portions of the downstream flow or upstream flow are passed through the filtering unit 50 so as form the clarified liquid such that the clarified liquid is collected at the top or bottom end of the filtering unit 50 with the assistance of an exterior pump [not shown]. In other words, when the hydrocyclone separator 1 of the present invention is utilized, the large and small particles can be collected simultaneously via the downstream flow and the upstream flow caused within the separator body 10 when the raw mixed fluid is fed into the separator body 10 via the feed 20. In addition, the clarified liquid can be collected simultaneously via a filtering tube.

The feature of the hydrocyclone separator of the present invention resides in that since the filtering unit 50 is implemented within the hydrocyclone separator, once the raw mixed fluid is fed thereinto, the large and small particles and the clarified liquid can be collected simultaneously in addition to that the separator can be easily operated and is low in cost. Note that the prior art hydrocyclone separator has a single inlet and two outlets, i.e., overflow and underflow liquids respectively. However, the hydrocyclone separator of the present invention also has a single inlet but three outlets, i.e., overflow and underflow liquids and the clarified liquid respectively.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A hydrocyclone separator comprising:
    a separator body defining a hollow chamber having an upper body part and a lower body part extending downward axially and gradually narrow relative said upper body part;
    a feeder connected helically to said upper body part from a lateral side thereof for feeding a raw liquid thereinto;
    an upstream outlet disposed axially within said separator body, having an upper part projecting upward and axially from said upper body part and a lower part extending into the lower body part;
    a downstream outlet attached axially to a lowermost end of said lower body part and in spatially communication with said lower body part;
    a filtering unit disposed axially within an inner wall confining said upstream outlet, having an upper part projecting upwardly and outwardly from a top end of said upstream outlet and a lower part extending into said downstream outlet, said filtering unit consisting of a filtering membrane having an inner wall confining said filtering member.

2. The separator according to claim 1, wherein said separator body, said feeder, said upstream outlet, said downstream outlet and said filtering unit are integrally formed with one another.

3. The separator according to claim 1, wherein said separator body, said feeder, said upstream outlet, said downstream outlet and said filtering unit are independently fabricated and are later assembled together in order to form the separator.

4. The separator according to claim 3, wherein said filtering unit includes a coupler head defining said upper part projecting upwardly and outwardly from said top end of said upstream outlet for connected spatially to an exterior pipe and a filtering tube that is defined by said inner wall of said filtering membrane and that projects downward from said coupler head in such a manner to extend within a bottom end of said downstream outlet.

5. The separator according to claim 4, wherein said filtering membrane is selected from a group consisting of a ceramic membrane, a glass fiber membrane, Polyvinylidene fluoride [PVDF] membrane, a Teflon membrane, an active carbon membrane, a resinous ion exchange membrane and other porous materials.

* * * * *